United States Patent
Cheng et al.

(10) Patent No.: US 12,534,224 B2
(45) Date of Patent: Jan. 27, 2026

(54) MULTIFUNCTIONAL AIRCRAFT DEICING VEHICLE WITH STEAM JET

(71) Applicants: Binzhou University, Binzhou (CN); Binzhou Municipal Bureau of Industry and Information Technology, Binzhou (CN); Shandong University of Science and Technology, Qingdao (CN)

(72) Inventors: Mingming Cheng, Binzhou (CN); Jianbo Gao, Binzhou (CN); Gang Zhou, Qingdao (CN); Daoquan Cheng, Binzhou (CN); Cheng Wang, Binzhou (CN); Shuai Zhang, Binzhou (CN); Shuoshi Zhang, Binzhou (CN); Wenqing Liu, Binzhou (CN); Huazhen Sun, Binzhou (CN); Hongkun Zhang, Binzhou (CN)

(73) Assignees: Binzhou University, Binzhou (CN); Binzhou Municipal Bureau of Industry and Information Technology, Binzhou (CN); Shandong University of Science and Technology, Qingdao (CN)

(*) Notice: Subject to any disclaimer, the term of this patent is extended or adjusted under 35 U.S.C. 154(b) by 313 days.

(21) Appl. No.: 18/505,947

(22) Filed: Nov. 9, 2023

(65) Prior Publication Data

US 2024/0067360 A1   Feb. 29, 2024

Related U.S. Application Data

(63) Continuation of application No. PCT/CN2021/132687, filed on Nov. 24, 2021.

(30) Foreign Application Priority Data

Oct. 11, 2021 (CN) .................. 202111182539.X (51) Int. Cl.
*B64F 5/23* (2017.01)
*B05B 13/00* (2006.01)

(52) U.S. Cl.
CPC .............. *B64F 5/23* (2017.01); *B05B 13/005* (2013.01)

(58) Field of Classification Search
CPC ........................................ B64F 5/23
See application file for complete search history.

(56) References Cited

U.S. PATENT DOCUMENTS 5,244,168 A * 9/1993 Williams .................. B64F 5/20
  244/134 C
5,755,404 A * 5/1998 Numbers .................. B64F 5/20
  239/589

(Continued)

FOREIGN PATENT DOCUMENTS

CN  1772393  5/2006
CN  202343358  7/2012

(Continued)

OTHER PUBLICATIONS

PCT International Application No. PCT/CN21/132687, International Search Report and Written Opinion of the International Searching Authority, dated Nov. 24, 2021, 4 pages.

(Continued)

*Primary Examiner* — Christopher P Ellis
(74) *Attorney, Agent, or Firm* — DLA Piper LLP (US)

(57) ABSTRACT

Provided is a steam jet multifunctional aircraft deicing vehicle with steam jet, includes a vehicle body, where a steam generating assembly is arranged in the vehicle body, and the steam generating assembly is connected with a steam conveying assembly. A moving assembly is rotatably connected above the vehicle body, and the moving assembly is rotatably connected with an execution assembly. The execution assembly includes a first spray head assembly and (Continued)

a second spray head assembly. The steam conveying assembly includes a first supercharger and a second supercharger arranged side by side, where an air outlet end of the first supercharger is communicated with one end of a first air outlet pipe, and an other end of the first air outlet pipe is communicated with spray heads of the second spray head assembly through a first air pipeline.

10 Claims, 9 Drawing Sheets

(56) References Cited

U.S. PATENT DOCUMENTS

| | | | |
|---|---|---|---|
| 6,250,588 B1 * | 6/2001 | Numbers | B64F 5/20 |
| | | | 244/134 C |
| 2006/0107910 A1 | 5/2006 | Bourgault | |
| 2010/0012784 A1 | 1/2010 | Bourgault | |
| 2020/0377231 A1 * | 12/2020 | Luca | B64F 5/23 |
| 2024/0067360 A1 * | 2/2024 | Cheng | B05B 13/005 |

FOREIGN PATENT DOCUMENTS

| | | | | |
|---|---|---|---|---|
| CN | 202389271 | | 8/2012 | |
| CN | 204718442 | | 10/2015 | |
| CN | 106121710 | | 11/2016 | |
| CN | 106492383 | | 3/2017 | |
| CN | 109987236 | | 7/2019 | |
| CN | 109987247 | | 7/2019 | |
| CN | 110002000 A * | | 7/2019 | B64F 5/23 |
| CN | 112202132 | | 1/2021 | |
| WO | WO-2018191511 A1 * | | 10/2018 | B66F 11/044 |
| WO | WO-2020082180 A1 * | | 4/2020 | B05B 13/005 |

OTHER PUBLICATIONS

Office Action of Chinese Application No. 202111182539.X, mailed date Jul. 19, 2022, 14 pages.

Action of Chinese Application No. 202111182539.X, mailed date Nov. 1, 2022, 11 pages.

* cited by examiner

MULTIFUNCTIONAL AIRCRAFT DEICING VEHICLE WITH STEAM JET

CROSS-REFERENCE TO RELATED APPLICATIONS

This application is a continuation of PCT/CN2021/132687, filed Nov. 24, 2021, which claims priority of Chinese Patent Application No. 202111182539.X, filed on Oct. 11, 2021, the contents of which are hereby incorporated by reference.

TECHNICAL FIELD

The disclosure relates to the technical field of aircraft deicing, and in particular to a multifunctional aircraft deicing vehicle with a steam jet.

BACKGROUND

Under icy conditions, operational safety of an aircraft may be directly impacted by ice, snow and frost, which will make an external aircraft surface rough, increase the weight of the aircraft, limit the movement range of the control aircraft surface, and lead to instrument errors. In severe cases, the aircraft may also be caused to stall and suddenly tilt up abnormally, thus greatly reducing a flight performance of the aircraft. Especially when the aircraft takes off and rises, a flight altitude may be difficult to control, and in severe cases, an air crash will be caused. Adverse meteorological conditions in winter will bring serious harm to the aircraft. Therefore, in order to ensure normal shipping and flight safety, it is necessary to remove the ice, frost, and snow on the aircraft surface. An existing technique for aircraft snow removal is to spray aircraft anti-icing liquids on the aircraft surface. Main assemblies of the anti-icing liquid used are methanol, ethanol (alcohol), ethylene glycol, etc. This anti-icing liquid has characteristics of low condensation temperature, good mixing performance with water, strong adhesion to an anti-icing surface, no chemical corrosion to the anti-icing surface, no toxicity, and good fire resistance, so this anti-icing liquid is widely used in aircraft deicing. However, the cost of this anti-icing liquid is high.

China patent CN109987247A discloses a steam jet multifunctional aircraft deicing vehicle, including a vehicle body, a steam generating device, a steam conveying device, a deicing execution device and a deicing control system, etc. The steam generating device of the deicing vehicle uses fuel as a power source and may generate high-temperature saturated steam and high-temperature air, and includes a water tank, a water pump, a blower and a steam generator. The water tank provides a water source for the steam generator through the water pump. The blower provides air for the steam generator to generate steam and high-temperature air with different humidity and saturation. The deicing execution device of the deicing vehicle may not generate steam and high-temperature air at the same time, so the device may only deice first, and then dry ice water. Because of a low outdoor temperature, first melted ice water will easily freeze again if it is not evaporated in time, so deicing efficiency will be negatively affected. Therefore, a deicing vehicle with simultaneous deicing and drying is urgently needed to improve the deicing efficiency.

SUMMARY

An objective of the present disclosure is to provide a multifunctional aircraft deicing vehicle with steam jet, so as to solve the above problems, realize deicing and drying at the same time, and improve deicing efficiency.

In order to achieve the above objective, embodiments of the disclosure provide the following scheme. The multifunctional aircraft deicing vehicle with a steam jet includes a vehicle body, where a steam generating assembly is arranged in the vehicle body, and the steam generating assembly is connected with a steam conveying assembly. A moving assembly is rotatably connected above the vehicle body, and the moving assembly is rotatably connected with an execution assembly.

The execution assembly includes a first spray head assembly, a second spray head assembly is arranged below the first spray head assembly. The first spray head assembly is used for spraying high-temperature air, and the second spray head assembly is used for spraying steam, and the first spray head assembly and the second spray head assembly are respectively fixedly connected with a plurality of first spray heads and second spray heads.

The steam conveying assembly includes a first supercharger and a second supercharger arranged side by side, an air inlet end of the first supercharger and an air inlet end of the second supercharger are communicated with a buffer tank. An air outlet end of the first supercharger is communicated with one end of a first air outlet pipe, and an other end of the first air outlet pipe is communicated with the second spray heads of the second spray head assembly through a first air pipeline. The air inlet end of the second supercharger is communicated with a blower, an air outlet end of the second supercharger is communicated with one end of a second air outlet pipe, and an other end of the second air outlet pipe is connected to the first spray heads of the first spray head assembly through a second air pipeline.

Optionally, the moving assembly includes a rotating disc rotatably connected with an upper part of the vehicle body, a rotating rod is hinged above the rotating disc, a telescopic rod is slidably connected with the rotating rod, a tail end of the telescopic rod is rotatably connected with the execution assembly, and two ends of a second hydraulic cylinder are hinged with the rotating disc and the rotating rod respectively.

Optionally, one end of the rotating rod close to the telescopic rod is fixedly connected with a displacement sensor through bolts, and the rotating disc is engaged with an angle sensor.

Optionally, the execution assembly further includes a deicing plate, where the deicing plate is fixedly connected with the first spray heads and the second spray heads at one side away from the telescopic rod, and two ends of a first hydraulic cylinder are hinged with the deicing plate and the telescopic rod respectively.

Optionally, the plurality of the first spray heads and the second spray heads are arranged in a matrix at equal intervals.

Optionally, the steam generating assembly includes a first water tank, where an lower end of the first water tank is communicated with a water inlet end of a water pump, and a water outlet end of the water pump is communicated with an upper part of a second water tank, and a lower part of the second water tank is provided with a heating part and a descaling part.

Optionally, the heating part includes a plurality of evaporation tubes communicating with the second water tank, where the evaporation tubes are in a U-shaped structure. Sleeves are sleeved on sides of the evaporation tubes away from the second water tank, solenoids are sleeved outside of the sleeves, outlet ends of the evaporation tubes are communicated with a confluence tube, and the confluence tube is communicated with a buffer tank.

Optionally, the descaling part includes an ultrasonic generator, and the ultrasonic generator is fixedly connected with a plurality of vibrating tubes. Each of the vibrating tubes has a T-shaped structure, and each of the vibrating tubes is sleeved to a bottom of a corresponding evaporation tube of the plurality of evaporation tubes.

Optionally, the first spray heads and the second spray heads adopt CC fan nozzles.

Optionally, the water pump is a self-priming water pump.

Embodiments of the present disclosure have the following technical effects. The steam generating assembly is powered by a fuel generator in the deicing vehicle, and the steam sprayed by the second spray head assembly melts an ice layer on an aircraft surface into water, and the high-temperature air sprayed by the first spray head assembly heats and evaporates the water melted by the ice layer to keep the aircraft surface dry. The execution assembly may deice along a transverse direction or a longitudinal direction of a fuselage, and steam deicing and heating and evaporation of the water may be carried out at the same time, so as to prevent a situation where melted ice water is not cleaned in time and secondary icing occurs. The blower is added to an air path connected with the first spray head assembly, and the blower is used for supplementing air into the air path. Relatively dry and high-temperature air may be obtained by adjusting contents of supplemented air and steam to evaporate moisture on the aircraft surface. Air heat sprayed by the first spray head assembly comes from the steam generating assembly, so an independent heat source is not needed, and a heat utilization rate of the steam generating assembly is improved.

BRIEF DESCRIPTION OF THE DRAWINGS

In order to explain embodiments of the disclosure or technical schemes in the prior art more clearly, drawings needed in the embodiments will be briefly introduced below. Obviously, the drawings in the following description are only some embodiments of the disclosure.

DETAILED DESCRIPTION OF THE EMBODIMENTS

In the following, technical schemes in embodiments of the disclosure will be clearly and completely described with reference to attached drawings. Obviously, the described embodiments are only a part of the embodiments of the disclosure, but not all embodiments. Based on the embodiments described in this disclosure, numerous other embodiments may be obtained by persons of ordinary skill in the art without undue experimentation and, as such, belong to a scope of protection of the disclosure.

In order to make the above objects, features and advantages of the disclosure easier to understand, the disclosure may be further described in detail with attached drawings and specific embodiments.

Embodiment 1

Figure 1:
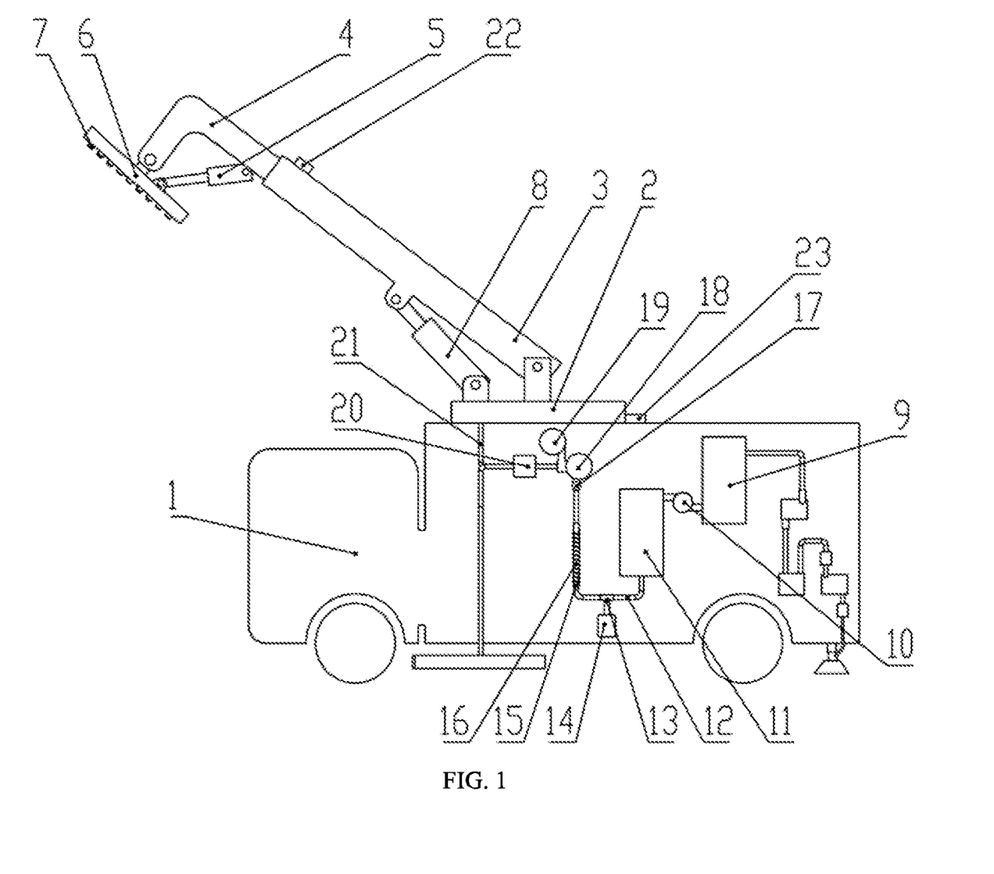
FIG. 1 is a schematic structural diagram of the disclosure.
Figure 2:
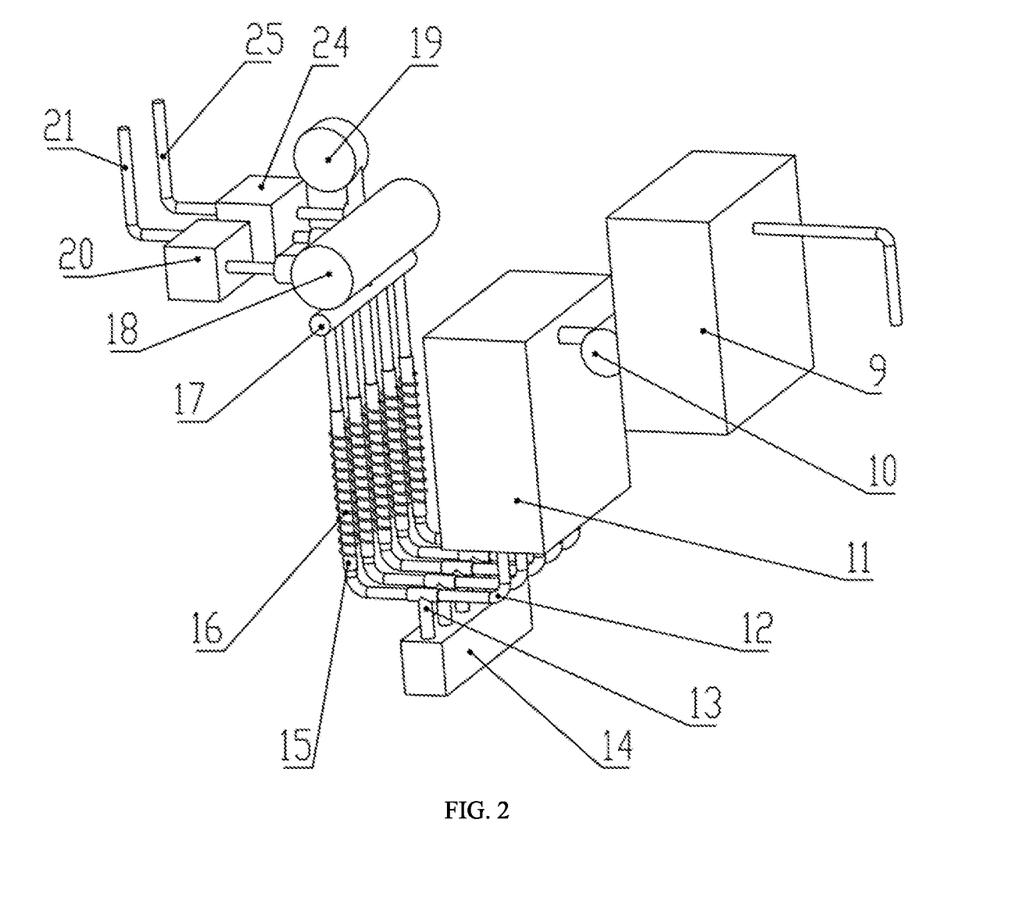
FIG. 2 is a schematic structural diagram of a steam generating assembly and a steam conveying assembly according to the disclosure.
Figure 3:
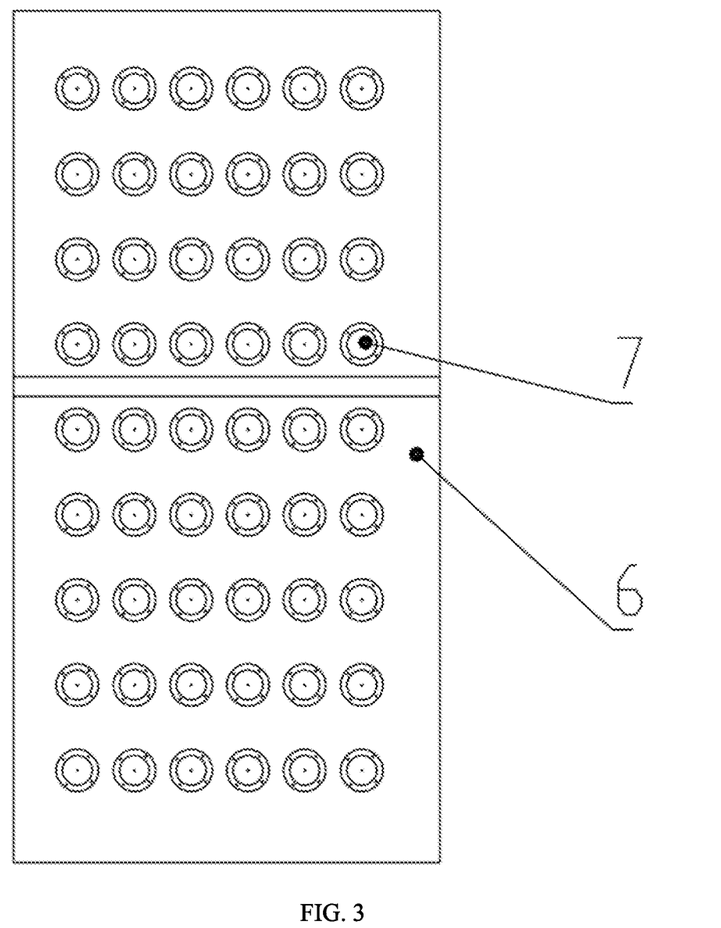
FIG. 3 is a schematic structural diagram of an execution assembly of the disclosure.

With reference to FIGS. 1-3, a multifunctional aircraft deicing vehicle with steam jet in this embodiment includes a vehicle body 1, where a steam generating assembly is arranged in the vehicle body 1, and the steam generating assembly is connected with a steam conveying assembly. A moving assembly is rotatably connected above the vehicle body 1, and the moving assembly is rotatably connected with an execution assembly.

The execution assembly includes a first spray head assembly, a second spray head assembly is arranged below the first spray head assembly. The first spray head assembly is used for spraying high-temperature air, and the second spray head assembly is used for spraying steam, and the first spray head assembly and the second spray head assembly are respectively fixedly connected with a plurality of spray heads 7.

The steam conveying assembly includes a first supercharger 20 and a second supercharger 24 arranged side by side, an air inlet end of the first supercharger 20 and an air inlet end of the second supercharger 24 are communicated with a buffer tank 18. An air outlet end of the first supercharger 20 communicates with one end of a first air outlet pipe 21 and an other end of the first air outlet pipe 21 communicates with the spray heads 7 of the second spray head assembly through a first air pipeline. The air inlet end of the second supercharger 24 communicates with a blower 19, an air outlet end of the second supercharger 24 communicates with one end of a second air outlet pipe 25, and an other end of the second air outlet pipe 25 is connected to the spray heads 7 of the first spray head assembly through a second air pipeline. The steam generating assembly is powered by a fuel generator in the deicing vehicle, and the steam sprayed by the second spray head assembly melts an ice layer on an aircraft surface into water, and the high-temperature air sprayed by the first spray head assembly heats and evaporates the water melted by the ice layer to keep the aircraft surface dry. The execution assembly may deice along a transverse direction or a longitudinal direction of a fuselage, and steam deicing and heating and evaporation of the water may be carried out at the same time, so as to prevent a situation where melted ice water is not cleaned in time and secondary icing occurs. The blower 19 is added to an air path connected with the first spray head assembly, and the blower 19 is used for supplementing air into the air path. Relatively dry and high-temperature air may be obtained by adjusting the contents of supplemented air and steam to evaporate moisture on the aircraft surface. Air heat sprayed by the first spray head assembly comes from the steam generating assembly, so an independent heat source is not needed, and a heat utilization rate of the steam generating assembly is improved.

In an embodiment, the moving assembly includes a rotating disc 2 rotatably connected with an upper part of the vehicle body 1, a rotating rod 3 is hinged above the rotating disc 2, a telescopic rod 4 is slidably connected with the rotating rod 3, a tail end of the telescopic rod 4 is rotatably connected with the execution assembly, and two ends of a second hydraulic cylinder 8 are hinged with the rotating disc 2 and the rotating rod 3 respectively. The rotating disc 2 may drive the execution assembly to rotate, extension and shortening of the second hydraulic cylinder 8 are used to adjust an included angle between the rotating rod 3 and the rotating disc 2, and the telescopic rod 4 may slide inside the rotating rod 3 to adapt to a height of the aircraft fuselage.

In an embodiment, one end of the rotating rod 3 close to the telescopic rod 4 is fixedly connected with a displacement sensor 22 through bolts, and the rotating disc 2 is engaged with an angle sensor 23. In a transverse deicing operation of the fuselage according to the disclosure, a vehicle body is kept parallel to the fuselage, while the rotating disc 2 is rotating, the telescopic rod 4 is extended or shortened along the rotating rod 3, so as to ensure that a distance between the execution assembly and the fuselage remains substantially unchanged. The displacement sensor 22 is used to obtain a distance between the execution assembly and an end of the rotating rod 3, and the angle sensor 23 is used to obtain a rotation angle of the rotating disc 2, and the distance and the rotation angle are in one-to-one correspondence, which not only ensures a deicing effect, but also prevents the execution assembly from colliding with the fuselage.

In an embodiment, the execution assembly further includes a deicing plate 6, where the deicing plate 6 is fixedly connected with the spray heads 7 at one side away from the telescopic rod 4, and two ends of a first hydraulic cylinder 5 are hinged with the deicing plate 6 and the telescopic rod 4 respectively. The spray heads 7 are installed in the deicing plate 6 by an embedded method, and air inlet ends of the plurality of spray heads 7 for deicing are communicated with each other, and air inlet ends of the plurality of spray heads 7 for drying are also communicated with each other. Two groups of spray heads 7 with different functions are separated by a diaphragm on the deicing plate 6, and extension and shortening of the first hydraulic cylinder 5 control a rotation angle of the deicing plate 6, and the angle of the deicing plate 6 may be adjusted to adapt to an arc-shaped fuselage.

In an embodiment, the plurality of spray heads 7 are arranged in a matrix at equal intervals, which is beneficial to improving uniformity of steam and air injected into the aircraft fuselage.

In an embodiment, the steam generating assembly includes a first water tank 9, where a lower end of the first water tank 9 communicates with a water inlet end of a water pump 10, a water outlet end of the water pump 10 communicates with an upper part of a second water tank 11, and a lower part of the second water tank 11 is provided with a heating part and a descaling part. The steam generating assembly has a double water tank structure, so a water capacity is increased.

In an embodiment, the heating part includes a plurality of evaporation tubes 12 communicating with the second water tank 11, where the evaporation tubes 12 are in a U-shaped structure. Sleeves 15 are sleeved on sides of the evaporation tubes 12 away from the second water tank 11, solenoids 16 are sleeved outside of the sleeves 15, outlet ends of the evaporation tubes 12 communicate with a confluence tube 17, and the confluence tube 17 communicates with a buffer tank 18. The solenoids 16 are used to generate eddy current to heat the evaporation tubes 12. This heating mode is different from a conventional steam generating assembly. The energized solenoids 16 replace resistive heating rods, which improves utilization efficiency of electrical energy and is more reliable and less prone to damage than the conventional heating rods. The sleeves 15 between the solenoids 16 and the evaporation tubes 12 prevents heat of the evaporation tubes 12 from being conducted to the outside, and meanwhile isolates the solenoids 16 from the metal evaporation tubes 12, thus avoiding an occurrence of electric leakage accidents.

In an embodiment, the descaling part includes an ultrasonic generator 14, and the ultrasonic generator 14 is fixedly connected with a plurality of vibrating tubes 13. Each of the vibrating tubes 13 has a T-shaped structure, and each of the vibrating tubes 13 is sleeved to a bottom of corresponding one of the evaporation tubes 12. The ultrasonic generator 14 is used to generate ultrasonic waves, and the ultrasonic waves are transmitted to the bottoms of the evaporation tubes 12 along the vibrating tubes 13, so that scale may not adhere to the evaporation tube 12. This can also prevent scale from blocking the evaporation tubes 12 and affecting heat transfer efficiency.

In an embodiment, the spray heads 7 adopt CC fan nozzles.

In an embodiment, the water pump 10 is a self-priming water pump.

A working process of this embodiment is as follows. The fuel generator in the deicing vehicle is started to generate electric energy, the current is transformed into single-phase alternating current with adjustable frequency, and an induced alternating electromagnetic field is generated around the solenoids 16, so that an induced current, also called eddy current, is generated in the evaporation tubes 12 in the alternating electromagnetic field. Finally, the evaporation tubes 12 are heated by an eddy current effect, and the water in the evaporation tubes 12 is converted into the steam. The steam generated by the plurality of evaporation tubes 12 is gathered in the buffer tank 18, and the steam in the buffer tank 18 flows out in two ways. One way is communicated with the spray heads 7 in the second spray head assembly, and the generated steam is used for deicing. The other way is provided with air by the blower 19 and communicates with the spray heads 7 in the first spray head assembly, and the air is mixed with the steam, so that humidity of the steam is reduced, thereby obtaining relatively dry high-temperature air for evaporating the water melted by ice and preventing molten water from freezing for a second time. During the deicing operation, the telescopic rod 4 is extended to reach a height of a deicing position of the aircraft, the angle of the deicing plate 6 is adjusted to make the deicing plate 6 directly face the fuselage, and the first spray head assembly and the second spray head assembly simultaneously spray air, so that the deicing operation and drying operation are simultaneously carried out, thus improving deicing efficiency. During transverse deicing operation of the fuselage, the vehicle body is kept parallel to the fuselage, the telescopic rod 4 is extended or shortened along the rotating rod 3 while the rotating disc 2 is rotating, so as to ensure that the distance between the execution assembly and the fuselage remains substantially unchanged. The displacement sensor 22 is used to obtain the distance between the execution assembly and an end of the rotating rod 3, the angle sensor 23 is used to obtain the rotation angle of the rotating disc 2, and the distance and the rotation angle are in a one-to-one correspondence, which not only ensures a deicing effect, but also prevents the deicing plate 6 from touching the fuselage.

Embodiment 2

Figure 4:
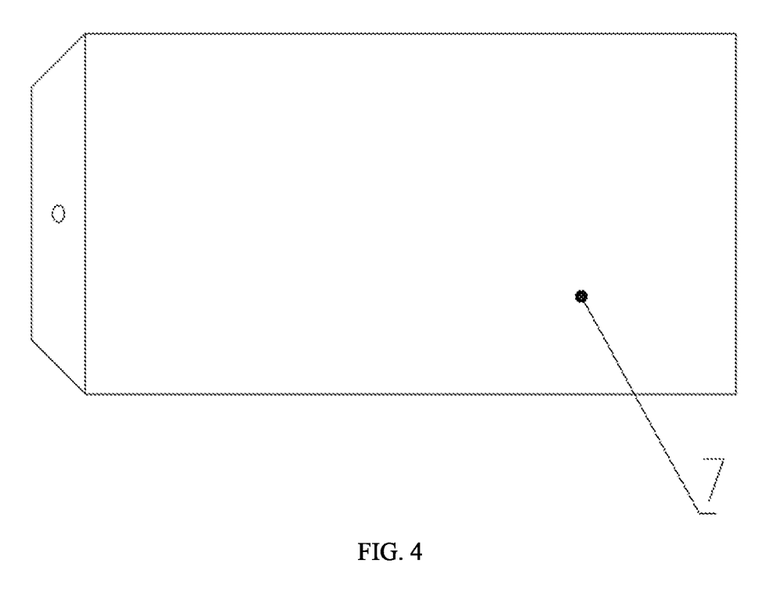
FIG. 4 is a schematic diagram of a spray head structure in Embodiment 2 of the disclosure.
Figure 5:
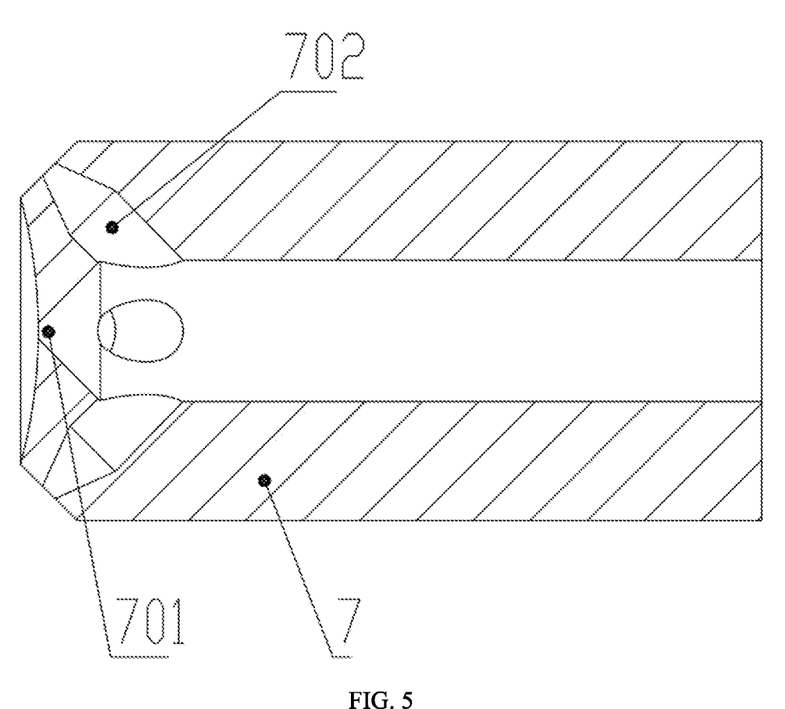
FIG. 5 is a cross-sectional view of a spray head in Embodiment 2 of the disclosure.

With reference to FIG. 4 and FIG. 5, the only difference between this embodiment and Embodiment 1 is that a center of each of outlet ends of the spray heads 7 is provided with a first air outlet 701, and an edge of each of the outlet ends of the spray heads 7 is provided with a plurality of second air outlets 702. The plurality of second air outlets 702 are arranged at equal intervals along an axis of each of the spray heads 7, the plurality of second air outlets 702 are connected to the first air outlet 701 in a same direction, and the center of each of the outlet ends of the spray heads 7 is a circular concave surface. Each of the spray heads 7 according to this embodiment has a plurality of air outlets, the first air outlet 701 located in the center of each of the spray heads 7 is a main air outlet, and the plurality of second air outlets 702 are auxiliary air outlets. Steam or air ejected from the first air outlet 701 is vertical to a front end face of each of the spray heads 7, and its flow rate and impact force are large, which plays a major role in deicing and drying. Steam or air ejected from each of the second air outlets 702 has a certain angle with the axis of each of the spray heads 7, thus playing an auxiliary deicing and drying role. The steam or the air ejected by the spray heads 7 in this embodiment has an umbrella like structure, increasing an effective deicing area and achieving a better deicing effect.

Embodiment 3

Figure 6:
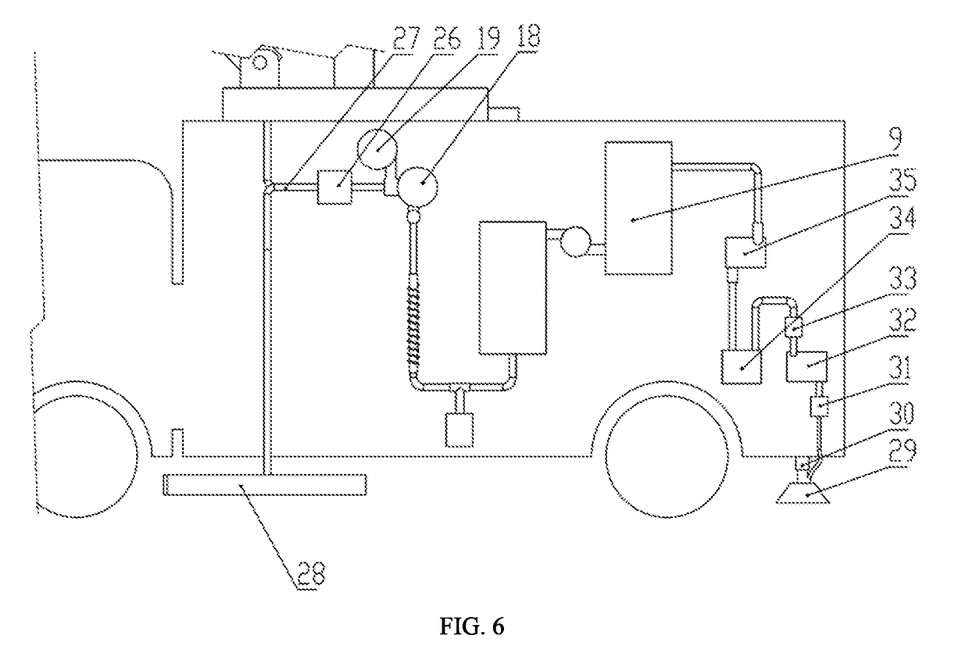
FIG. 6 is a schematic structural diagram of Embodiment 3 of the disclosure.

With reference to FIG. 6, the only difference between this embodiment and Embodiment 2 is that the buffer tank 18 communicates with an air inlet end of a third supercharger 26, and an air outlet end of the third supercharger 26 communicates with an ice melting plate 28 through a third air outlet pipe 27. The ice melting plate 28 is located below a middle of the vehicle body 1, and the ice melting plate 28 includes a plurality of spray heads 7.

A water suction port 29 is arranged below a tail of the vehicle body 1, a movable end of a third hydraulic cylinder 30 is fixedly connected above the water suction port 29, and a fixed end of the third hydraulic cylinder 30 is fixedly connected below the tail of the vehicle body 1. A first filter 31 resides above the water suction port 29 within a water pipeline, a first waste water pump 32 resides above first filter 31 within the water pipeline, a second filter 33 resides above the first waste water pump 32 within the water pipeline, a waste water tank 34 communicates with the second filter 33 through an inverted L-shaped water pipeline, a second waste water pump 35 resides above the waste water tank 34 within the water pipeline, and the second waste water pump 35 communicates with an upper part of the first water tank 9 through the water pipeline. The ice melting plate 28 is used to remove snow and an ice layer on a runway of an airport. The snow and the ice layer are melted into water in the steam sprayed by the spray heads 7. The third hydraulic cylinder 30 controls rising and falling of the water suction port 29. When the water suction port 29 descends to be in contact with a ground, accumulated water on the ground drops under an action of the first waste water pump 32 to be collected, and the accumulated water flows into the water tank through a filtering action of the first filter 31 and the second filter 33. The first filter 31 and the second filter 33 are provided with substances with adsorption and filtration functions such as filter paper and activated carbon, so as to remove large-particle impurities in the water. The accumulated water is pumped into the first water tank 9 through the second waste water pump 35, so that the accumulated water may be reused.

Embodiment 4

Figure 7:
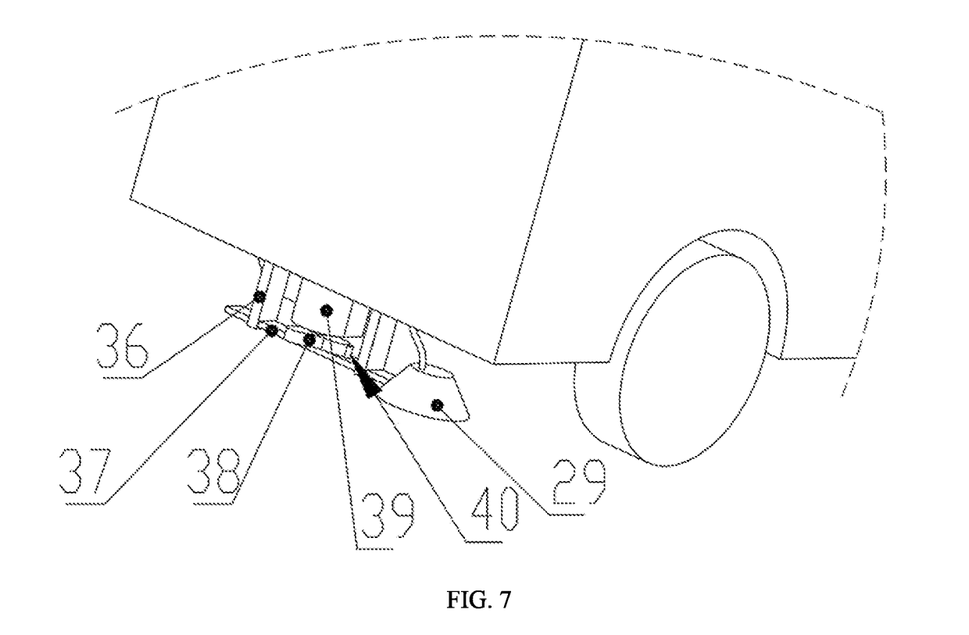
FIG. 7 is a schematic structural diagram of Embodiment 4 of the disclosure.
Figure 8:
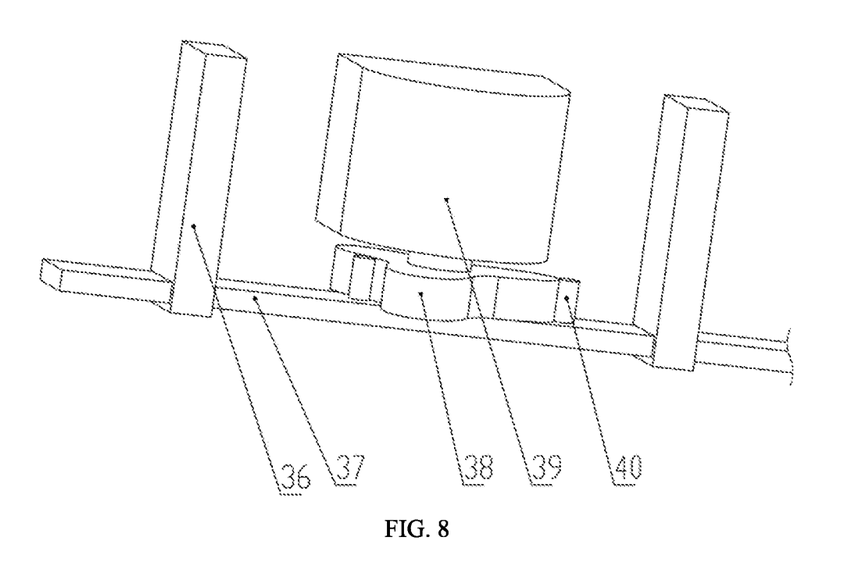
FIG. 8 is a schematic structural diagram of a traversing assembly in Embodiment 4 of the disclosure.
Figure 9:
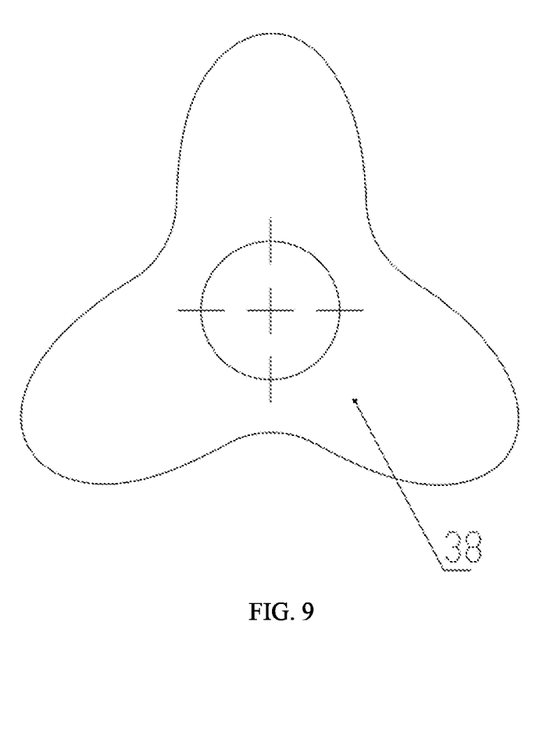
FIG. 9 is a schematic diagram of a cam structure in Embodiment 4 of the disclosure.

With reference to FIGS. 7-9, the only difference between this embodiment and Embodiment 3 is that a rear side of a bottom of the vehicle body 1 is fixedly connected with a traversing assembly, where the traversing assembly includes symmetrically arranged support plates 36. The support plates 36 are cubic in structure and fixedly connected with the vehicle body 1, each of the support plates 36 is provided with a chute at one end away from the vehicle body 1, a sliding plate 37 is slidably connected in the chute, and one end of the sliding plate 37 is fixedly connected with the water suction port 29. One side of the sliding plate 37 close to the vehicle body 1 is rotatably connected with two sliding columns 40, and an axis of each of sliding columns 40 is perpendicular to the sliding plate 37. A rotating motor 39 is arranged between the two supporting plates 36, and the rotating motor 39 is fixedly connected with the bottom of the vehicle body 1. A shaft end of the rotating motor 39 is connected with a cam 38, and sides of the cam 38 are in contact with the sliding columns 40. Each of the sliding columns 40 includes three protruding ends, where the three protruding ends are arranged at equal intervals along an axis of the cam 38.

The rotating motor 39 drives the cam 38 to rotate, and the sides of the cam 38 are always in contact with the sliding columns 40. During rotation of the cam 38, the cam 38 drives the sliding plate 37 to reciprocate through the sliding columns 40, and the sliding plate 37 drives the water suction port 29 to move, and the water suction port 29 contacts a bottom of the runway. Because the water suction port 29 continuously reciprocates, a water suction area is indirectly expanded and water suction efficiency is improved.

The first supercharger 20, the second supercharger 24, the third supercharger 26, the rotating disc 2, the displacement sensor 22, the angle sensor 23, the telescopic rod 4, the solenoids 16 and the ultrasonic generator 14 are electrically connected with a controller, including but not limited to a programmable logic controller (PLC), a single chip computer and the like. A connection mode is well known in this field.

In a description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in accompanying drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by ordinary technicians in the field to the technical scheme of the disclosure shall fall within the protection scope determined by claims of the disclosure.

The invention claimed is:

1. A multifunctional aircraft deicing vehicle with a steam jet, comprising:
   a vehicle body, wherein a steam generating assembly is arranged in the vehicle body, and the steam generating assembly is connected with a steam conveying assembly; and
   a moving assembly rotatably connected above the vehicle body, and the moving assembly is rotatably connected with an execution assembly;
   wherein the execution assembly comprises a first spray head assembly, a second spray head assembly is arranged below the first spray head assembly; wherein the first spray head assembly is used for spraying high-temperature air, and the second spray head assembly is used for spraying steam, and the first spray head assembly and the second spray head assembly are respectively fixedly connected with a plurality of first spray heads and second spray heads;

wherein the steam conveying assembly comprises a first supercharger and a second supercharger arranged side by side, wherein an air inlet end of the first supercharger and an air inlet end of the second supercharger are communicated with a buffer tank; wherein an air outlet end of the first supercharger is communicated with one end of a first air outlet pipe, and an other end of the first air outlet pipe is communicated with the second spray heads of the second spray head assembly through a first air pipeline; wherein the air inlet end of the second supercharger is communicated with a blower, an air outlet end of the second supercharger is communicated with one end of a second air outlet pipe, and an other end of the second air outlet pipe is connected to the first spray heads of the first spray head assembly through a second air pipeline.

2. The steam jet multifunctional aircraft deicing vehicle with a steam jet according to claim 1, wherein the moving assembly comprises a rotating disc rotatably connected with an upper part of the vehicle body, a rotating rod is hinged above the rotating disc, a telescopic rod is slidably connected with the rotating rod, a tail end of the telescopic rod is rotatably connected with the execution assembly, and two ends of a second hydraulic cylinder are hinged with the rotating disc and the rotating rod respectively.

3. The steam jet multifunctional aircraft deicing vehicle with a steam jet according to claim 2, wherein one end of the rotating rod close to the telescopic rod is fixedly connected with a displacement sensor through bolts, and the rotating disc is engaged and connected with an angle sensor.

4. The steam jet multifunctional aircraft deicing vehicle with a steam jet according to claim 2, wherein the execution assembly further comprises a deicing plate; the deicing plate is fixedly connected with the first spray heads and the second spray heads at one side away from the telescopic rod, and two ends of a first hydraulic cylinder are hinged with the deicing plate and the telescopic rod respectively.

5. The steam jet multifunctional aircraft deicing vehicle with steam jet according to claim 1, wherein the plurality of the first spray heads and the second spray heads are arranged in a matrix at equal intervals.

6. The steam jet multifunctional aircraft deicing vehicle with a steam jet according to claim 1, wherein the steam generating assembly comprises a first water tank; an lower end of the first water tank is communicated with a water inlet end of a water pump, and a water outlet end of the water pump is communicated with an upper part of a second water tank, and a lower part of the second water tank is provided with a heating part and a descaling part.

7. The steam jet multifunctional aircraft deicing vehicle with steam jet according to claim 6, wherein the heating part comprises a plurality of evaporation tubes communicating with the second water tank; the evaporation tubes are in a u-shaped structure, sleeves are sleeved on sides of the evaporation tubes away from the second water tank, solenoids are sleeved to an outside of the sleeves, outlet ends of the evaporation tubes are communicated with a confluence tube, and the confluence tube is communicated with a buffer tank.

8. The steam jet multifunctional aircraft deicing vehicle with a steam jet according to claim 7, wherein the descaling part comprises an ultrasonic generator, and the ultrasonic generator is fixedly connected with a plurality of vibrating tubes; each of the vibrating tubes has a T-shaped structure, and each of the vibrating tubes is sleeved to a bottom of corresponding one of the evaporation tubes.

9. The steam jet multifunctional aircraft deicing vehicle with a steam jet according to claim 1, wherein the first spray heads and the second spray heads adopt fan nozzles.

10. The steam jet multifunctional aircraft deicing vehicle with a steam jet according to claim 6, wherein the water pump is a self-priming water pump.

* * * * *